US011897160B1

(12) United States Patent
Wang

(10) Patent No.: US 11,897,160 B1
(45) Date of Patent: Feb. 13, 2024

(54) ELECTRIC SAW GUIDE PLATE CAPABLE OF RECYCLING LUBRICATING OIL

(71) Applicant: HANGZHOU EXCELSIOR&SHARP GARDEN TOOLS CO., LTD., Hangzhou (CN)

(72) Inventor: Quanfu Wang, Hangzhou (CN)

(73) Assignee: HANGZHOU EXCELSIOR & SHARP GARDEN TOOLS CO., LTD., Hangzhou (CN)

( * ) Notice: Subject to any disclaimer, the term of this patent is extended or adjusted under 35 U.S.C. 154(b) by 0 days.

(21) Appl. No.: 17/819,943

(22) Filed: Aug. 15, 2022

(51) Int. Cl.
*B27B 17/02* (2006.01)
*B27B 17/12* (2006.01)

(52) U.S. Cl.
CPC .............. *B27B 17/02* (2013.01); *B27B 17/12* (2013.01)

(58) Field of Classification Search
CPC ................................ B27B 17/02; B27B 17/12
See application file for complete search history.

(56) References Cited

U.S. PATENT DOCUMENTS 5,056,224 A * 10/1991 Seigneur ................ B27B 17/12 144/34.1
5,092,044 A * 3/1992 Edgerton ................ B27B 17/12 30/381
6,186,136 B1 * 2/2001 Osborne ................ B27B 17/12 451/298
6,643,933 B2 * 11/2003 Seigneur ............... B27B 17/025 144/34.6

FOREIGN PATENT DOCUMENTS

| | | | | | |
|---|---|---|---|---|---|
| CN | 101502973 | A | * | 8/2009 | |
| CN | 101708564 | A | | 5/2010 | |
| CN | 205835556 | U | | 12/2016 | |
| CN | 206216837 | U | | 6/2017 | |
| CN | 211891212 | U | | 11/2020 | |
| CN | 213033802 | U | | 4/2021 | |
| DE | 908296 | C | * | 4/1954 | |
| DE | 3542476 | A | * | 6/1987 | ............. B27B 17/02 |
| EP | 0337753 | A2 | * | 10/1989 | |
| EP | 3064329 | A1 | * | 9/2016 | ............. B27B 17/02 |
| WO | WO-2011014396 | A1 | * | 2/2011 | ............. B27B 17/02 |

* cited by examiner

*Primary Examiner* — Jennifer S Matthews

(57) ABSTRACT

Disclosed is an electric saw guide plate capable of recycling lubricating oil, comprising two outer guide plates and an oil guide plate connected between the two outer guide plates; outer edges of inner walls of the outer guide plates and a periphery of the oil guide plate form a guide plate groove for containing a saw chain, a plurality of oil inlets are formed in an upper end of the oil guide plate and a plurality of oil outlets are formed in a lower end of the oil guide plate, the oil inlets and the oil outlets are communicated through an oil guide channel, and the oil inlets and the oil outlets are communicated with the guide plate groove at the same time. According to the electric saw guide plate, the saw chain is lubricated, and meanwhile the recycling of the lubricating oil is also realized.

3 Claims, 4 Drawing Sheets

ELECTRIC SAW GUIDE PLATE CAPABLE OF RECYCLING LUBRICATING OIL

CROSS REFERENCE TO RELATED APPLICATIONS

This application claims foreign priority of Chinese Patent Application No. 202110692770.7, filed on Jun. 22, 2021 in the China National Intellectual Property Administration, the disclosures of all of which are hereby incorporated by reference.

TECHNICAL FIELD

The present invention belongs to the technical field of electric chain saws, and more particularly, relates to an electric saw guide plate capable of recycling lubricating oil.

BACKGROUND

Chain saw refers to a woodworking electric tool for cutting with a rotating chain saw blade. After the chain saw is powered on, a motor rotates, and an output shaft of the motor drives a chain wheel to rotate, thus driving the chain saw blade to slide at a high speed on a guide plate. When the chain saw is operated, the chain saw blade is operated at a high speed on the guide plate. A linear speed of an existing electric chain saw is generally about 14 m/s, and a lot of heat may be generated due to friction. If the chain saw blade is not filled with lubricating oil in time, the chain saw blade may overheat easily, resulting in damage to the chain and the guide plate. Therefore, it is a very important measure to fill the lubricating oil to the chain saw blade.

The guide plate is an important component for supporting the chain and smoothly operating the chain. At present, most of the guide plates used are solid, and some of the guide plates are hollow. However, the hollow parts are not communicated with each other, and are not communicated with the outside either, and the purpose of being hollow is weight reduction only. At present, the lubricating oil for the guide plate used enters a guide plate groove from an oil hole in a tail portion of a guide plate body, and then is brought to each lubricating surface by the saw chain. By this lubricating method, most of the lubricating oil is shaken off by the operated saw chain or flows off near an oil inlet of the guide plate, so that a utilization efficiency of the lubricating oil is very low, and a cooling effect is very weak. In addition, oil droplets splashed out affect a working environment, and meanwhile, the waste of the lubricating oil may cause chain smoothness reduction and cutting sharpness reduction.

SUMMARY

The present invention aims to provide an electric saw guide plate capable of recycling lubricating oil, which can reduce splashing of the lubricating oil, improve a use efficiency of the lubricating oil, and realize recycling of the lubricating oil, so as to efficiently cool and lubricate a saw chain.

In order to achieve the above objective, the present invention provides the following technical solutions.

An electric saw guide plate capable of recycling lubricating oil comprises two outer guide plates and an oil guide plate mounted between the two outer guide plates, wherein outer edges of inner walls of the outer guide plates and a periphery of the oil guide plate form a guide plate groove for containing a saw chain, a plurality of oil inlets are formed in an upper end of the oil guide plate and a plurality of oil outlets are formed in a lower end of the oil guide plate, the oil inlets and the oil outlets are communicated through an oil guide channel, and the oil inlets and the oil outlets are communicated with the guide plate groove at the same time.

Preferably, the inner walls of the outer guide plates are provided with oil blocking grooves corresponding to the oil inlets, lower ends of the oil blocking grooves are close to the oil inlets, and the oil blocking grooves are obliquely and backwardly arranged along front ends of the outer guide plates.

Preferably, the oil inlets are connected with an oil inlet channel, the oil outlets are connected with an oil outlet channel, the oil inlet channel and the oil outlet channel are communicated through the oil guide channel, the oil inlet channel is obliquely and backwardly arranged along a front end of the oil guide plate, the oil outlet channel is obliquely and backwardly arranged along the front end of the oil guide plate, the oil outlet channel is obliquely and downwardly arranged along a rear end of the oil guide plate, an angle between the oil inlet channel and a horizontal direction ranges from 100 degrees to 170 degrees, and an angle between the oil outlet channel and the horizontal direction ranges from 10 degrees to 80 degrees.

Preferably, front ends of the oil inlets are provided with first end faces, rear ends of the oil inlets are provided with second end faces, the first end faces are obliquely and forwardly arranged, the second end faces are obliquely and backwardly arranged, at least one of the first end face and the second end face is cambered, and relative to a centerline of the oil guide plate, a highest point of the first end face is 0.5 mm to 2 mm higher than that of the second end face.

Preferably, an upper end of a rear portion and a low end of the rear portion of the oil guide plate are provided with oil return openings, and the oil return openings are communicated with the oil guide channel through a vertically arranged oil return channel.

Preferably, the inner walls of the outer guide plates are respectively provided with the oil blocking grooves corresponding to the oil return openings and the oil outlets, and an oblique direction of the oil blocking grooves corresponding to the oil outlets is the same as a direction of the oil outlet channel, and an oblique direction of the oil blocking grooves corresponding to the oil return openings is the same as a direction of the oil inlet channel.

Preferably, a number of the oil inlets is greater than that of the oil outlets, and an oil storage tank is arranged between the oil inlets and the oil outlets.

More preferably, the rear end of the oil guide plate is provided with two oil filling openings with symmetrical upper and lower ends, and the oil filling openings are communicated with the oil storage tank through oil filling channels, and the oil filling channels are arranged on front and rear sides of the oil guide plate.

Preferably, the front ends of the outer guide plates are provided with positioning holes for fixing the outer guide plates with guide wheels, and the rear ends of the outer guide plates are provided with mounting grooves and pin holes for fixing the outer guide plates on an engine portion of the chain saw.

Preferably, a width of the oil guide channel is larger than that of the oil outlet channel, and the width of the oil guide channel is larger than that of the oil inlet channel. Therefore, the oil can flow to all required places in a balanced mode.

Compared with the prior art, the present invention has the following beneficial effects.

The oil guide plate is provided with the oil inlets and the oil outlets which are communicated through the oil guide channel, so that the lubricating oil may be transported to different positions of the guide plate groove through multiple paths instead of being concentrated near the oil filling openings; and the lubricating oil is transported to many places, and an amount of the lubricating oil in each place is relatively small, which is beneficial for improving a lubricating efficiency and avoiding splashing caused by excessive oil in a single position. Particularly, the present invention may further achieve the following effects.

1. According to the electric saw guide plate, the oil blocking grooves are formed in the inner walls of the outer guide plates, and the oil inlets and the oil outlets are formed in the oil guide plate, so that when the electric saw is used, the lubricating oil carried on the saw chain is blocked by the oil blocking grooves and driven by air to be pressed into the oil inlets due to different-height end faces of the oil inlets through an air pressure difference, and under the drive of air and a gravity action, the oil entering from the oil inlets can flow into the oil outlets along the oil guide channel, so that the saw chain is lubricated, and meanwhile the cyclic utilization of the lubricating oil is also realized.

2. According to the electric saw guide plate, the splashing of the lubricating oil can be avoided, and the chain is operated more powerfully and smoothly. In addition, the front and rear end faces of the oil inlets are the cambered end faces, which can avoid tiny sawdust from being stuck so as to ensure smooth flowing of oil droplets.

Figure 1:
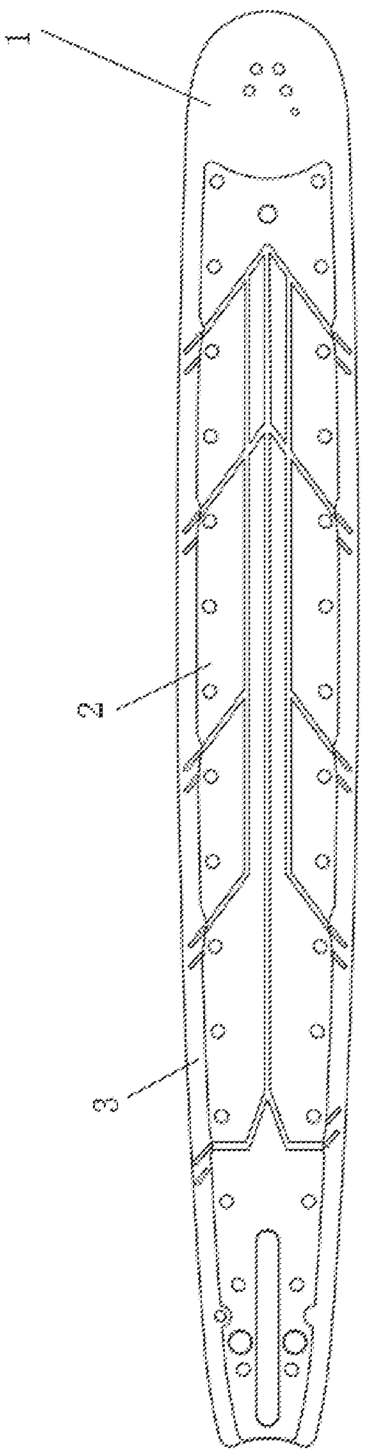
FIG. 1 is a schematic diagram of an overall structure of a guide plate of Embodiment 1.
Figure 2:
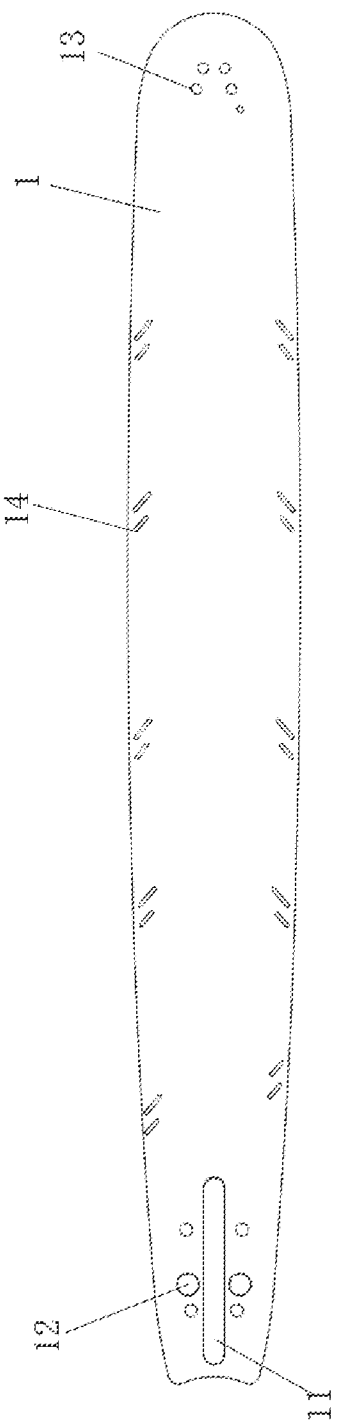
FIG. 2 is a schematic structural diagram of outer guide plates of the present invention.
Figure 3:
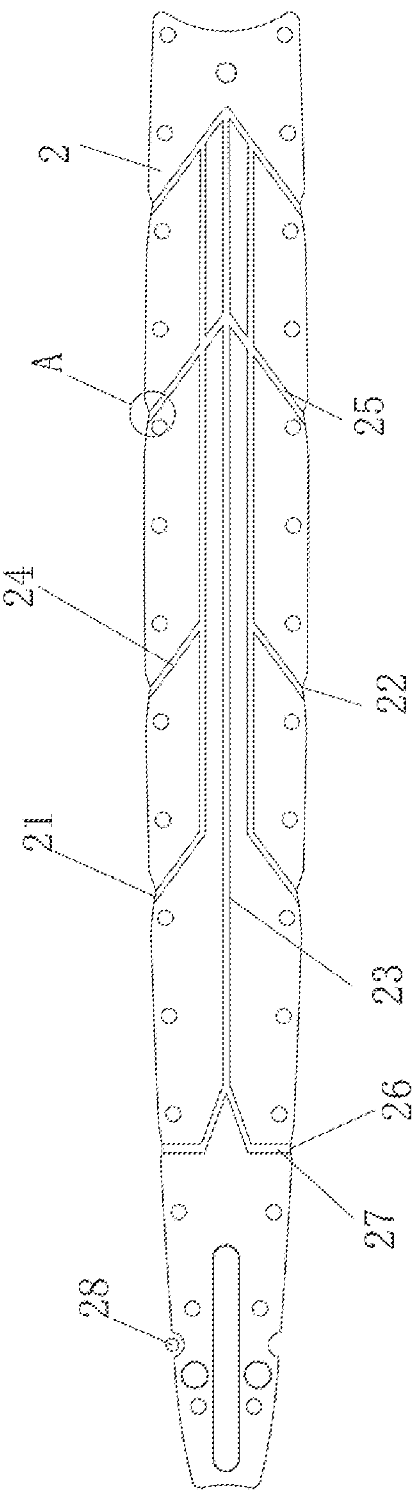
FIG. 3 is a schematic structural diagram of an oil guide plate of Embodiment 2.
Figure 4:
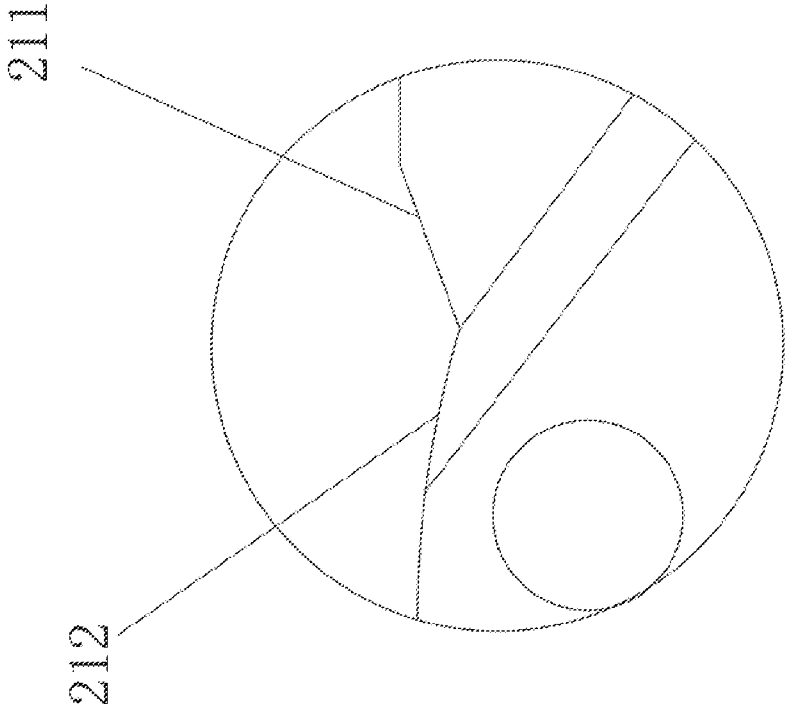
FIG. 4 is an enlarged view of a part A in FIG. 3.

In the drawings, 1 refers to outer guide plate; 2 refers to oil guide plate; 3 refers to guide plate groove; 11 refers to mounting groove; 12 refers to pin hole; 13 refers to positioning hole; 14 refers to oil blocking groove; 21 refers to oil inlet; 22 refers to oil outlet; 23 refers to oil guide channel; 24 refers to oil inlet channel; 25 refers to oil outlet channel; 26 refers to oil return opening; 27 refers to oil return channel; 28 refers to oil filling opening; 29 refers to oil storage tank; 20 refers to oil filling channel; 211 refers to first end face; and 212 refers to second end face.

DETAILED DESCRIPTION

The technical solutions in the embodiments of the present application will be clearly and completely described below with reference to the accompanying drawings in the embodiments of the present application. Obviously, the embodiments described are merely a part of, rather than all of, the embodiments of the present application. Based on the embodiments of the present application, all other embodiments obtained by those skilled in the art in the art without going through any creative effort shall fall within the scope of protection of the present application.

In the description of the present application, it should be understood that the orientations or positional relationships indicated by the terms such as “center”, “longitudinal”, “horizontal”, “length”, “width”, “thickness”, “upper”, “lower”, “front”, “rear”, “left”, “right”, “vertical”, “horizontal”, “top”, “bottom”, “inner”, “outer”, “clockwise”, “anticlockwise”, and the like, refer to the orientations or positional relationships based on the accompanying drawings, which are only intended to facilitate describing the present application and simplifying the description, and do not indicate or imply that the indicated devices or elements must have a specific orientation, be constructed and operated in a specific orientation, and therefore cannot be understood as a limitation of the present application. Moreover, the terms “first” and “second” are only used for descriptive purposes, but cannot be understood as indicating or implying relative importance, or implicitly indicating the number of indicated technical features. Therefore, the features defined with “first” and “second” can explicitly or implicitly include one or more of the features. In the description of the present application, the meaning of “multiple” is two or more than two, unless otherwise specifically defined.

In the description of the present application, it should be noted that unless expressly stipulated and defined otherwise, terms such as “installation”, “connected” and “connection”, etc., should understood broadly, for example, the connection may be fixed connection, or detachable connection or integral connection; may be mechanical connection, and may also be electric connection or may be mutual communication; may be direct connection, may also be indirect connection through an intermediate medium, and may also be internal communication of two elements or interaction relationship of two elements. The specific meaning of the above terms in the present application can be understood in a specific case by those of ordinary skills in the art.

It should be noted that the horizontal direction in the present application refers to the forward direction of the saw chain, which is namely the longitudinal direction of the guide plates.

Embodiment 1

As shown in FIG. 1 to FIG. 4, the embodiment relates to an electric saw guide plate capable of recycling lubricating oil, which comprises two outer guide plates 1 and an oil guide plate 2 mounted between the two outer guide plates 1. A size of the oil guide plate 2 is smaller than sizes of the outer guide plates 1, and outer edges of inner walls of the outer guide plates 1 and a periphery of the oil guide plate 2 form a guide plate groove 3 for containing a saw chain Rear ends of the outer guide plates 1 are provided with mounting grooves 11 and pin holes 12 for fixing the outer guide plates 1 on a housing on an engine portion of the chain saw. Front ends of the outer guide plates 1 are provided with positioning holes 13 for fixing the outer guide plates 1 with guide wheels. In the present application, the outer guide plates 1 and the oil guide plate 2 may also be fixed by a common method in the prior art, such as spot welding or laser welding.

In the embodiment of the present application, four oil inlets 21 are formed in an upper end of the oil guide plate 2 and four oil outlets 22 are formed in a lower end of the oil guide plate. The oil inlets 21 and the oil outlets 22 are communicated through an oil guide channel 23, and the oil inlets and the oil outlets are communicated with the guide plate groove 3 at the same time. Numbers of the oil inlets 21 and the oil outlets 22 may be set according to actual needs.

In the embodiment of the present application, the inner walls of the outer guide plates 1 are provided with oil blocking grooves 14 corresponding to the oil inlets 21, lower ends of the oil blocking grooves 14 are close to the oil inlets 21, and the oil blocking grooves 14 are obliquely and backwardly arranged along front ends of the outer guide plates 1.

The oil blocking grooves 14 are used for blocking the lubricating oil carried by the saw chain and shaken off under an inertia effect.

In the embodiment of the present application, the oil inlets 21 are connected with an oil inlet channel 24, the oil outlets 22 are connected with an oil outlet channel 25, the oil inlet channel 24 and the oil outlet channel 25 are communicated through the oil guide channel 23, and two oil inlet channels 24 located a front end of the oil guide plate 2 may be directly communicated with two oil outlet channels 24 located at the front end of the oil guide plate 2. The oil inlet channel 24 is obliquely and backwardly arranged along the front end of the oil guide plate 2, and the oil outlet channel 25 is obliquely and backwardly arranged along the front end of the oil guide plate 2. An angle between the oil inlet channel 24 and a horizontal direction is 170 degrees, and an angle between the oil outlet channel 25 and the horizontal direction is 80 degrees.

In the embodiment of the present application, front ends of the oil inlets 21 are provided with first end faces 211, and rear ends of the oil inlets 21 are provided with second end faces 212. The first end faces 211 are obliquely and forwardly arranged, and the second end faces 212 are obliquely and backwardly arranged. The first end faces 211 are oblique faces, and the second end faces 212 are cambered faces. Relative to a centerline of the oil guide plate, a highest point of the first end face 211 is 1 mm higher than that of the second end face 212. The oil inlets 21 are provided with two different-height end faces, which solves a problem that oil of a common electric chain saw assembly during rotation may be shaken off in a direction perpendicular to an operating direction of the saw chain, and the end faces are designed as the cambered faces, which can avoid tiny sawdust from being stuck.

In the embodiment of the present application, an upper end of a rear portion and a low end of the rear portion of the oil guide plate 2 are provided with oil return openings 26, and the oil return openings 26 are communicated with the oil guide channel 23 through an oil return channel 27. The rear end of the oil guide plate 2 is provided with oil filling openings 28, and the oil filling openings 28 are communicated with the oil guide channel 23. By arranging the oil return openings 26, air with very great kinetic energy may be driven to enter the oil return openings 26 by the saw chain rotating at a high speed, so that the lubricating oil flows out from the oil outlets 22 better. The inner walls of the outer guide plates 1 are respectively provided with oil blocking grooves 14 corresponding to the oil return openings 26 and the oil outlets 22, and an oblique direction of the oil blocking grooves 4 corresponding to the oil outlets 22 is the same as a direction of the oil outlet channel 25, and an oblique direction of the oil blocking grooves 4 corresponding to the oil return openings 26 is the same as a direction of the oil inlet channel 24.

A principle of the present invention is that: when the electric saw is operated, the saw chain, the outer guide plates and the oil guide plate form a relatively sealed space, the air driven by the saw chain rotating at a high speed has very great kinetic energy, and the oil guide plate 2 is provided with different-height first end faces 211 and second end faces 212, so that the huge kinetic energy of the air becomes potential energy, the lubricating oil is pressed into the oil inlets 21 under pressure of the potential energy, and flows into the oil guide channel 23 along the oil inlet channel 24, and the oil may enter the oil outlets 22 along the oil outlet channel 25 under a gravity action, thus lubricating the saw chain, avoiding splashing of the lubricating oil and realizing recycling of the lubricating oil at the same time, and operating the chain more powerfully and smoothly.

Embodiment 2

Figure 5:
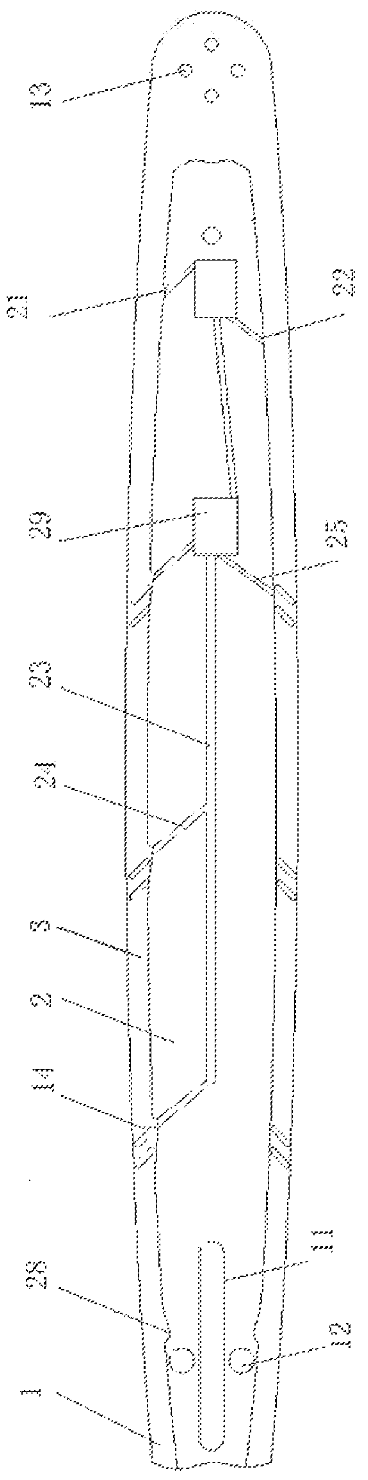
FIG. 5 is a schematic diagram of an overall structure of a guide plate of Embodiment 2.

As shown in FIG. 5, the embodiment relates to an electric saw guide plate capable of recycling lubricating oil, which comprises two outer guide plates 1 and an oil guide plate 2 mounted between the two outer guide plates 1. A size of the oil guide plate 2 is smaller than sizes of the outer guide plates 1, and outer edges of inner walls of the outer guide plates 1 and a periphery of the oil guide plate 2 form a guide plate groove 3 for containing a saw chain Rear ends of the outer guide plates 1 are provided with mounting grooves 11 and pin holes 12 for fixing the outer guide plates 1 on an engine portion of the chain saw. Front ends of the outer guide plates 1 are provided with positioning holes 13 for fixing the outer guide plates 1 with guide wheels. In the present application, the outer guide plates 1 and the oil guide plate 2 may also be fixed by a common method in the prior art, such as spot welding or laser welding. Four oil inlets 21 are formed in an upper end of the oil guide plate 2 and two oil outlets 22 are formed in a lower end of the oil guide plate. The oil inlets 21 and the oil outlets 22 are communicated through an oil guide channel 23, and the oil inlets and the oil outlets are communicated with the guide plate groove 3 at the same time.

In the embodiment of the present application, the inner walls of the outer guide plates 1 are provided with oil blocking grooves 14 corresponding to the oil inlets 21, lower ends of the oil blocking grooves 14 are close to the oil inlets 21, and the oil blocking grooves 14 are obliquely and downwardly arranged along front ends of the outer guide plates 1. The oil blocking grooves 14 are used for blocking the lubricating oil carried by the saw chain and shaken off under an inertia effect.

In the embodiment of the present application, the oil inlets 21 are connected with an oil inlet channel 24, the oil outlets 22 are connected with an oil outlet channel 25, and the oil inlet channel 24 and the oil outlet channel 25 are communicated through the oil guide channel 23. The oil inlet channel 24 is obliquely and downwardly arranged along the front end of the oil guide plate 2, and the oil outlet channel 25 is obliquely and downwardly arranged along the rear end of the oil guide plate 2. An angle between the oil inlet channel 24 and a horizontal direction is 160 degrees, and an angle between the oil outlet channel 25 and the horizontal direction is 60 degrees. An oil storage tank 29 is also connected between the oil inlet channel 24 and the oil outlet channel 25. Oil droplets of the lubricating oil enter the oil inlet channel 24 through the oil inlets 21, and then enter the oil guide channel to be collected in the oil storage tank 29. The lubricating oil in the oil storage tank 29 enters the oil outlets 22 through the oil outlet channel 25 under an air pressure and a self-gravity, thus lubricating the saw chain. The guide plates 1 may be provided with corresponding windows, through which the lubricating oil in the oil storage tank 29 may be observed.

Embodiment 3

Figure 6:
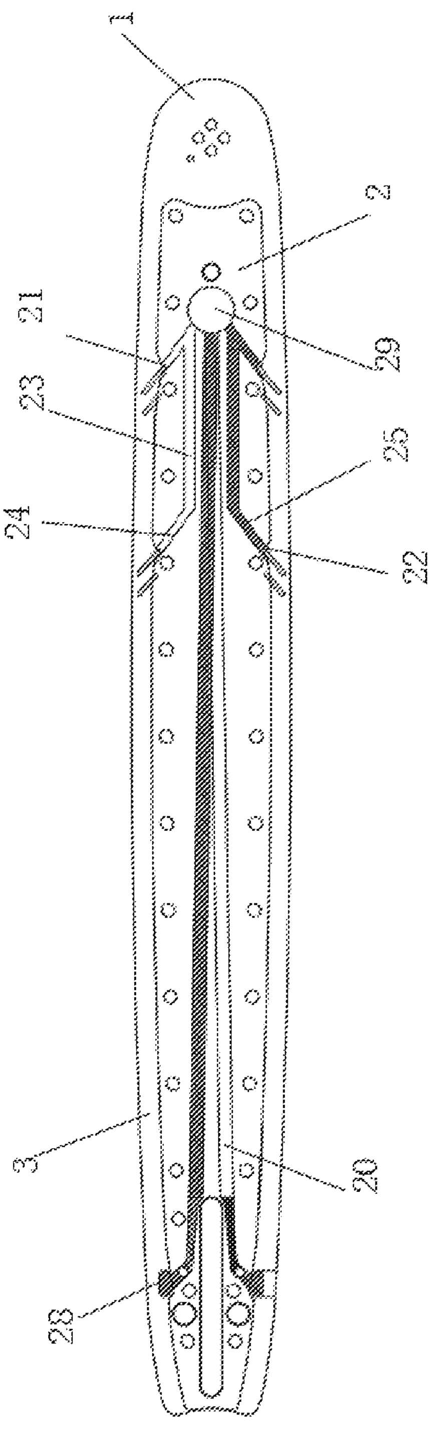
FIG. 6 is a schematic diagram of an overall structure of a guide plate of Embodiment 3.

As shown in FIG. 6, the embodiment relates to an electric saw guide plate capable of recycling lubricating oil, which comprises two outer guide plates 1 and an oil guide plate 2 mounted between the two outer guide plates 1. A size of the oil guide plate 2 is smaller than sizes of the outer guide plates 1, and outer edges of inner walls of the outer guide plates 1 and a periphery of the oil guide plate 2 form a guide plate groove 3 for containing a saw chain Rear ends of the outer guide plates 1 are provided with mounting grooves 11 and pin holes 12 for fixing the outer guide plates 1 on an engine portion of the chain saw. Front ends of the outer guide plates 1 are provided with positioning holes 13 for fixing the outer guide plates 1 with guide wheels. In the present application, the outer guide plates 1 and the oil guide plate 2 may also be fixed by a common method in the prior art, such as spot welding or laser welding. Two oil inlets 21 are formed in an upper end of the oil guide plate 2 and two oil outlets 22 are formed in a lower end of the oil guide plate. The oil inlets and the oil outlets are communicated with the guide plate groove 3 at the same time.

In the embodiment of the present application, a rear end of the oil guide plate 2 is provided with two oil filling openings 28 with symmetrical upper and lower ends, and the oil filling openings 28 are communicated with one oil storage tank 29 at the front end of the oil guide plate 2 through oil filling channels 20. The two oil inlets 21 are communicated with the oil storage tank 29 through the oil inlet channel 24 and the oil guide channel 23, and the two oil outlets 22 are communicated with the oil storage tank 29 through the oil guide channel 23 and the oil outlet channel 25.

In the embodiment of the present application, two oil filling channels 20 are provided, which correspond to the two oil filling openings 28 one by one. The two oil filling channels 20 are respectively arranged on front and rear sides of the oil guide plate 2. The two oil filling channels 20 have the same size and structure, and a depth of the oil filling channels 20 ranges from 0.5 mm to 1 mm. The lubricating oil enters the oil storage tank 29 through the oil filling openings 28 first and then lubricates the saw chain through the oil outlets 22, and the lubricating oil is recycled from the oil inlets 23 under the drive of the saw chain, thus realizing the recycling of the lubricating oil.

In Embodiment 3 of the present application, the electric saw guide plate is completely symmetrical up and down, so that upside-down mounting may not affect the use of the product, and a recycling effect of the lubricating oil is better.

In the above embodiments, the descriptions of the embodiments have their own emphasis. Parts not described in detail in certain embodiment refer to the related descriptions of other embodiments.

The electric saw provided by the embodiments of the present application is described in detail above. Specific examples are applied to explain the principle and implementation of the present application herein. The above embodiments are only used to help understand the technical solutions of the present application and the core idea thereof. It should be understood by those of ordinary skills in the art that the technical solutions described in the foregoing embodiments can be still modified, or some or all of the technical features can be equivalently replaced. However, these modifications or substitutions do not make the essence of the corresponding technical solutions depart from the scope of the technical solutions of various embodiments of the present application.

The invention claimed is:

1. An electric saw guide plate capable of recycling lubricating oil, comprising two outer guide plates and an oil guide plate mounted between the two outer guide plates, wherein outer edges of inner walls of the outer guide plates and a periphery of the oil guide plate form a guide plate groove for containing a saw chain, a plurality of oil inlets are formed in an upper end of the oil guide plate and a plurality of oil outlets are formed in a lower end of the oil guide plate, the oil inlets and the oil outlets are communicated through an oil guide channel, and the oil inlets and the oil outlets are communicated with the guide plate groove at the same time;

the inner walls of the outer guide plates are provided with oil blocking grooves corresponding to the oil inlets, lower ends of the oil blocking grooves are close to the oil inlets, and the oil blocking grooves are obliquely and backwardly arranged along front ends of the outer guide plates; and front ends of the oil inlets are provided with first end faces, rear ends of the oil inlets are provided with second end faces, the first end faces are obliquely and forwardly arranged, the second end faces are obliquely and backwardly arranged, at least one of the first end face and the second end face is cambered, and relative to a centerline of the oil guide plate, a highest point of the first end face is 0.5 mm to 2 mm higher than that of the second end face.

2. The electric saw guide plate capable of recycling lubricating oil according to claim 1, wherein the oil inlets are connected with an oil inlet channel, the oil outlets are connected with an oil outlet channel, the oil inlet channel and the oil outlet channel are communicated through the oil guide channel, the oil inlet channel is obliquely and backwardly arranged along a front end of the oil guide plate, the oil outlet channel is obliquely and backwardly arranged along the front end of the oil guide plate, an angle between the oil inlet channel and a horizontal direction ranges from 100 degrees to 170 degrees, and an angle between the oil outlet channel and the horizontal direction ranges from 10 degrees to 80 degrees.

3. The electric saw guide plate capable of recycling lubricating oil according to claim 1, wherein an oil storage tank is also arranged between the oil inlets and the oil outlets.

* * * * *